F. J. SEVERENCE, G. W. TODD, AND G. DE LOREE.
AUTOMATIC BOWLING ALLEY.
APPLICATION FILED DEC. 10, 1920.
1,431,695. Patented Oct. 10, 1922.
5 SHEETS—SHEET 1.
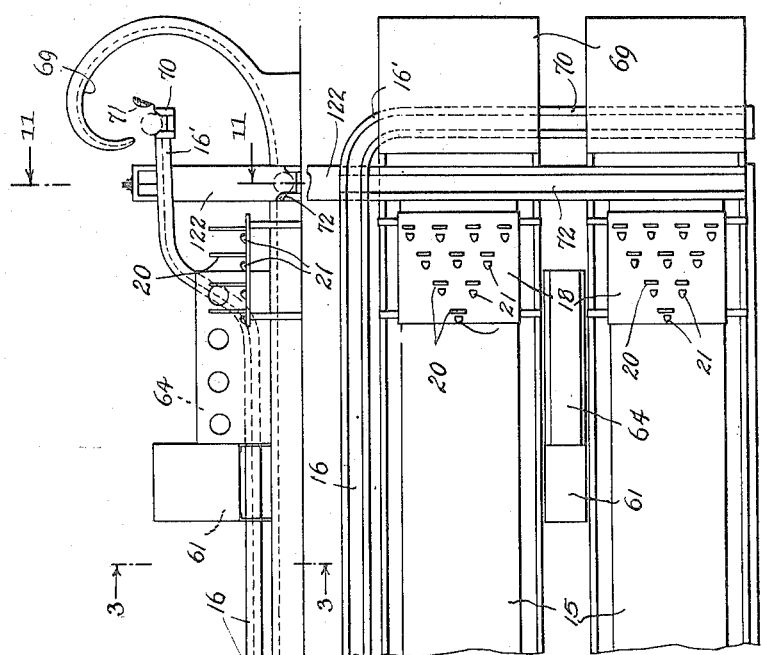
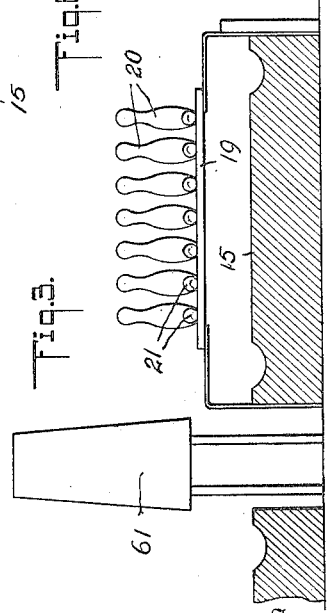
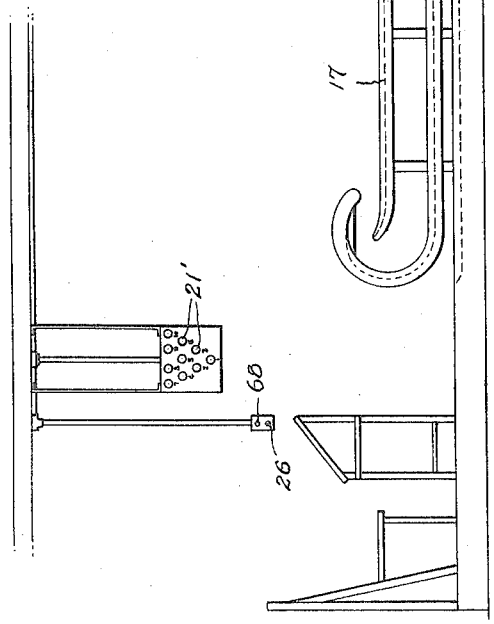

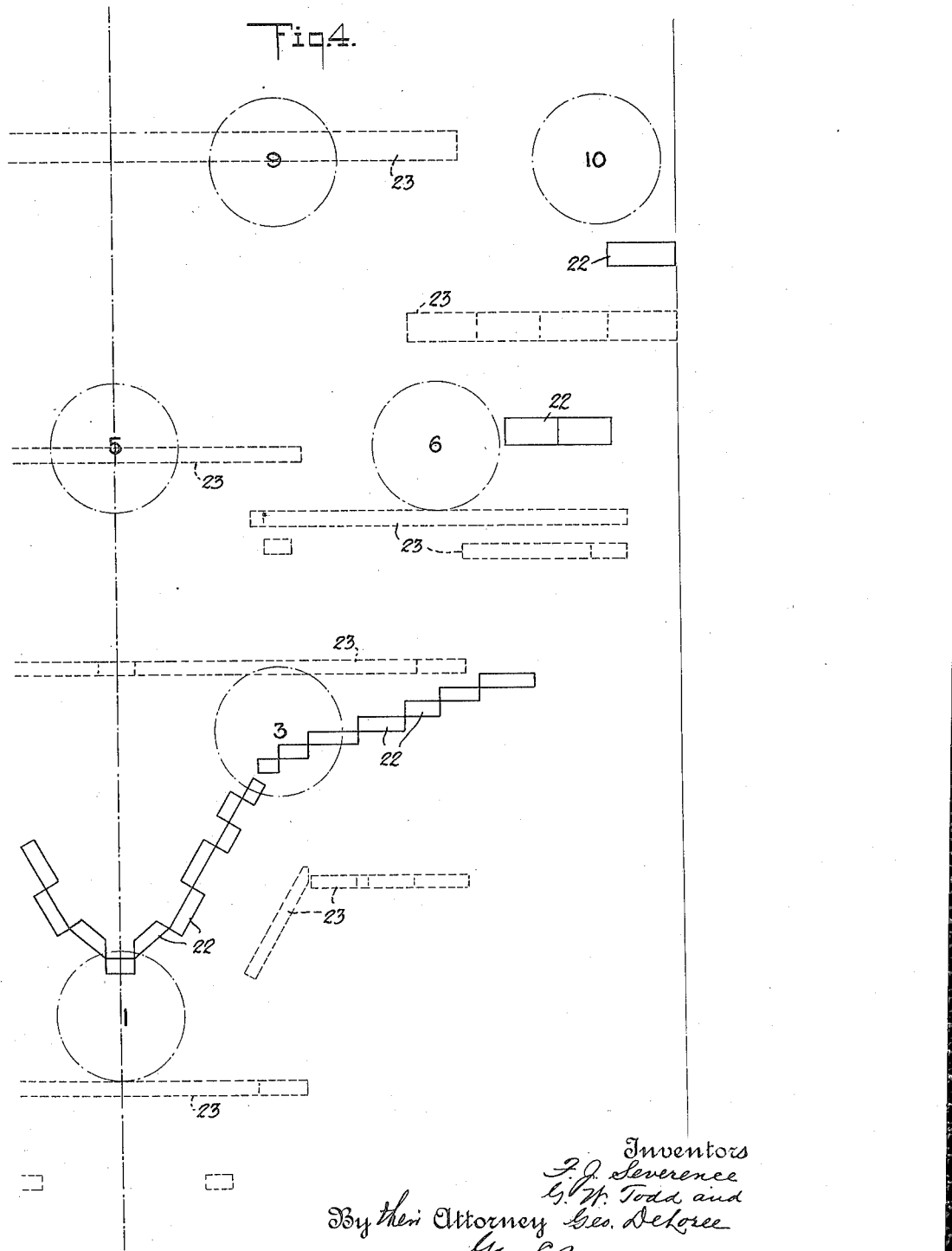

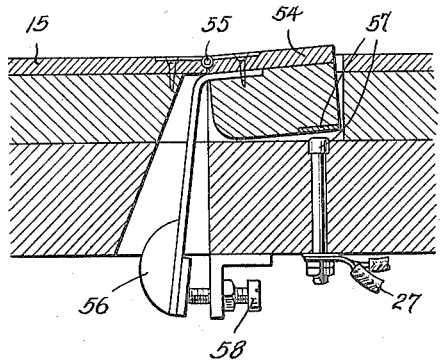
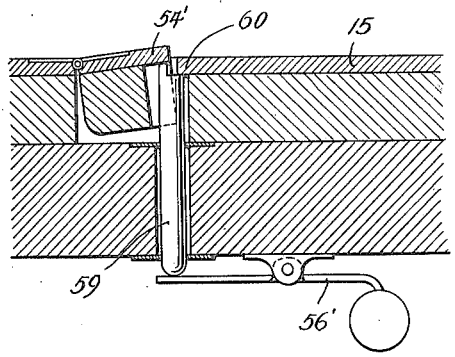
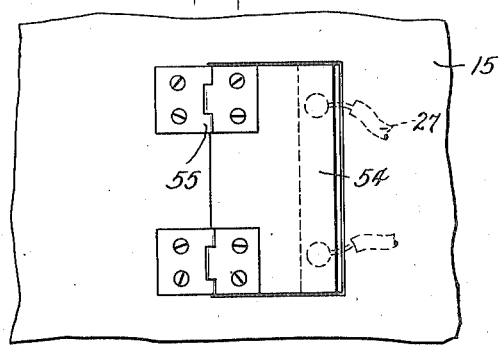
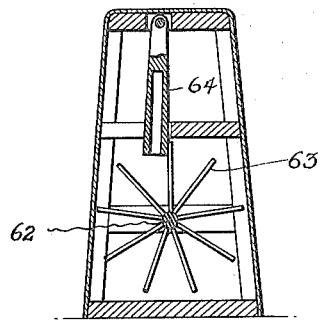
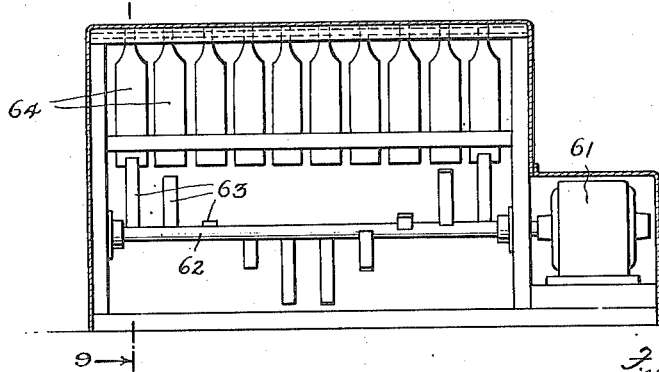

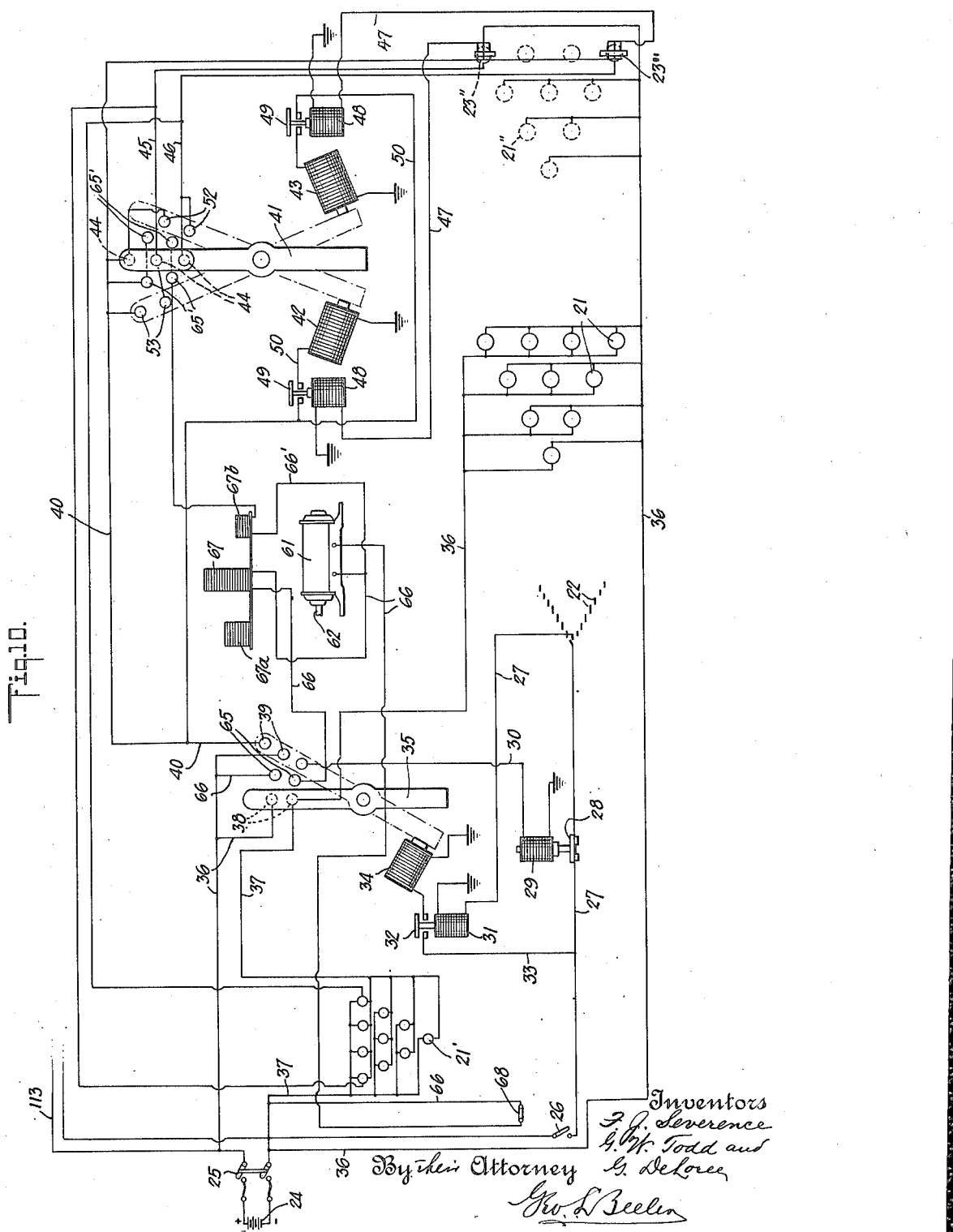

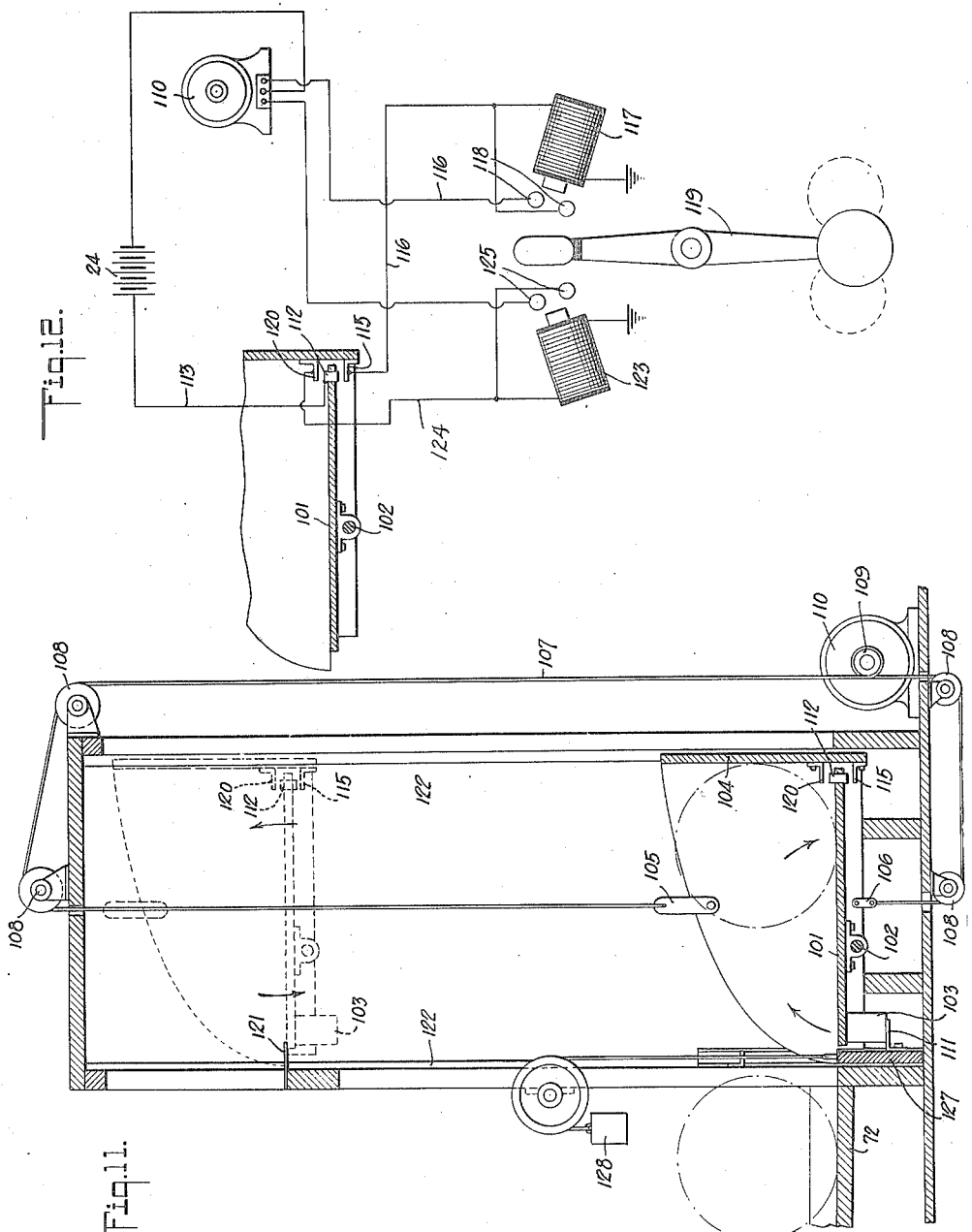

Patented Oct. 10, 1922.

1,431,695

UNITED STATES PATENT OFFICE.

FRANCIS J. SEVERENCE, GEORGE W. TODD, AND GEORGE DE LOREE, OF NEW YORK, N. Y.

AUTOMATIC BOWLING ALLEY.

Application filed December 10, 1920. Serial No. 429,722.

*To all whom it may concern:*

Be it known that we, FRANCIS JOSEPH SEVERENCE and GEORGE WILSON TODD, both citizens of the United States, and GEORGE DE LOREE, a citizen of France, all residing at New York city, borough of Manhattan, in the county of New York and State of New York, have invented certain new and useful Improvements in Automatic Bowling Alleys, of which the following is a specification.

This invention relates to amusement or game apparatus, and has particular reference to the well known and popular game of bowling or ten pins.

Among the objects of the invention is to provide a bowling alley, or an attachment for a standard bowling alley already existing, having electrically controlled devices so constructed and co-ordinated in their working parts as to make effective under the usual balls delivered in the usual manner, a system of registration of all the various quantitative strike equivalents achieved in the usual game. This result is accomplished by means of a combination of a mechanical, magnetic, or electrical scheme of registration by means of switches which are actuated by the rolling balls, and operating on a complementary plan of association or again of disassociation of the registering apparatus, so as to preserve the game as thus played in the new way to a virtual and practical correspondence to the old game.

Another object of the invention is to provide an automatic bowling alley including means providing for the extinction of one or any number of a group of lights, actuated by said switches, the lights severally so placed as to illuminate suitable objects simulating the usual pins, but which objects, though not capable of being struck by a ball, present to the players the appearance of being knocked down, or caused to disappear, as a result of the extinguishing of the lights pertaining thereto by the movement of the ball over the alley in a direction corresponding to the apparent fall of the pin objects. Said pin objects or objectives are preferably located just above the alley so as to present to the players practically the same appearance as the standard pins sitting on the alley, the space provided between the alley and the objectives being but slightly greater than the diameter of the largest bowling ball, providing ample room for the ball to pass beneath the same without touching anything but the alley. At the same time, the aforesaid lights are so connected together and co-ordinated with one another, and so connected with the mechanism as a whole, as to be freely and actually responsive under the action of the delivered balls to the equivalents of the customary strike or strikes of the game of bowling as played in the usual manner, and thereby corresponding to the actual knocking down of the pins.

Another object of the invention, therefore, is to provide a bowling game which eliminates the unnecessary actual knocking down and setting up again of the pins, saving thereby much unnecessary expense and time. Among the common sources of expense thus avoided are the enormous cost of pins which must be renewed frequently, and the employment of boys or the like for setting up the pins and returning the balls. Among the elements of loss of time overcome by this improvement are delays in the setting up of the pins and the return of the balls by boys who are proverbially very deliberate in their movements and who may be unavoidably called away from their stations during the progress of a game. It is well known that an expert bowler uses but one ball and hence he is obliged to await the return of his "first ball" before he delivers his "second ball." Many pin boys habitually take care of fallen pins before returning the ball, and whereas our game provides for the immediate return of the ball at all times and there being no pins to be handled or set up our game can be played from 40% to 50% more rapidly than the usual bowling game.

Another object of the invention is to construct the apparatus so that the pin objectives and the switches pertaining thereto shall be located with respect to the alley with scientific precision, thereby avoiding the objections due to inaccurate setting of the pins, as well as accidental or lucky strikes originating from imperfect pins, inaccurate setting of the pins, or other sources.

Another object of our invention is to provide a bowling alley which while unaccompanied with actual pins to be struck by the balls, will be provided with sounding mechanism serving to simulate the noise produced by the knock of the pins in the usual game, the amount of the noise produced by our mechanism being substantially proportional to the number of pin objectives affected by a ball. Said noise producing apparatus is provided for the benefit of those players who demand it as a natural accompaniment of the game, but we also provide means to eliminate all noise, excepting that of the rolling ball, at such times and places as make the pin noise objectionable.

Our equipment contemplates the provision of a multiplicity of normally open electric switches at what would correspond ordinarily to the pin field, so related to one another as to affect the illumination of precisely such pin objectives as a result of a ball passing over a certain switch, effecting the extinguishing of the lights of the same objectives, as would indicate the knocking down of correspondingly located pins by the action of the ball over the same path in playing the regular game in the old way. Similarly the lights of all pin objectives not affected by a passing ball, will remain functional and cause such objectives to represent pins remaining standing. The equipment, furthermore, contemplates what we may term two systems of switches, one for the first ball and the other for the second ball and made effective by and only by the action of the first ball.

Another object of our invention is to provide means for the immediate and automatic return to the player of each ball delivered. This means for returning the balls includes one construction for the quickest return of the ball through its own momentum, and other means associated therewith which will return a ball automatically though not quite so quickly, if the ball lacks sufficient momentum to make the first mentioned means effective.

We would point out also among many objects of our invention the fact of more satisfactory sanitary conditions as a result of the elimination of the usual pins and pin boys, and also the raising of the quality of the game from a social point of view from similar conditions.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of a bowling alley embodying our improvements.

Fig. 2 is a plan view of the same.

Fig. 3 is a vertical transverse section on the line 3—3 of Fig. 1.

Fig. 4 is a plan view of the pin or switch field.

Fig. 5 is a vertical sectional detail of one form of ball switch.

Fig. 6 is a plan view of the same.

Fig. 7 is a detail view of a modified form of ball switch.

Fig. 8 is a front elevation of the noise making mechanism.

Fig. 9 is a vertical section of the same, on the line 9—9 of Fig. 8.

Fig. 10 is a diagram of the electric wiring.

Fig. 11 is an elevation of the ball elevator.

Fig. 12 is a diagram of the wiring for the same.

Referring now more specifically to the drawings we show our improvement as applied to or embodying an alley 15 arranged ordinarily in duplicate and having a return gutter 16 common to both alleys. This return gutter may deliver the balls into any suitable receptacle indicated at 17 and with which we are not particularly concerned in this description.

As above premised we employ no pins in the usual sense of the term, but at any suitable place, preferably close above what is commonly employed as the pin board or field 18, we provide a platform 19 of any suitable construction upon which are located pin objectives which in size, number, and relative arrangement, have the appearance of the ten pins ordinarily employed in the game of bowling. These objectives are indicated at 20 and are so constructed that from the distance of the player they are practically invisible except when illuminated with a series of electric lamps 21, one for each pin objective, so that when any lamp is extinguished the visible effect is that the objective corresponding thereto disappears as being removed or "knocked down." The ball, however, passes beneath the platform 19 and touches nothing but the alley until the end of the alley is reached.

Recognizing that the ten pins in the usual bowling game are not only of a predetermined uniform size at the height above the alley corresponding to the radius of the ball, but also are presumed to be set so as to occupy scientifically precise positions in a triangle with the apex thereof toward the player, we provide two series or systems of electric switches so located and spaced from one another as to become functional respectively in accordance with all the possible movements of a ball along the alley. Moreover, these switches are so co-ordinated that any ball traveling in a path including a switch will close such switch and thereby will cause all pin objectives to disappear or to appear to fall in accordance with the exact number and location of pins that would be struck directly or indirectly by the ball moving in precisely the same path over the usual bowling alley. With reference to Fig.

4 we indicate on as large a scale as may be done one half of a pin or switch field and the location of the first and second ball systems of switches. Since the two sides of the switch field are identical the illustration of both sides will be unnecessary. By dotted circles we indicate the location and relative size of standard pins, these circles being identified by numbers corresponding to the pin numbers in usual practice.

We show in full lines at 22 a series of first ball switches, by which term we mean the first ball to strike any pins. By different character of lines we show a system or series of second ball switches 23. When the first ball is rolled over the pin or switch field one of the switches 22 will be closed resulting in the extinguishing of all lamps pertaining to the pin objectives that are entitled to be affected by the ball according to its path of movement. This is the effect, but as a matter of fact the closing of any switch 22 momentarily extinguishes all the lamps, although immediately thereafter all lamps are relighted with reference to those pin objectives that are not presumed to be affected by the action of said first ball. Again, after the first ball has operated one of its switches 22 all of the first ball switches are rendered idle and all of the second ball switches 23 are made functional.

A better understanding of this operation may be had from Fig. 10 in which the wiring and action are illustrated with reference to a straight nose hit, the hit made by the ball in the precise center of the alley and striking the first switch 22 directly back of the center of the first pin. This hit is one which knocks down all pins except those numbered 7 and 10 at the remote corners of the triangle. 24 indicates a source of electrical energy the lines from which are controlled by a master switch 25. The switches 22 and 23 are always normally open. A switch 26 is under the control of the score keeper and is closed when the game is to be played, the energy from the source coming through it and a line 27 to the switches 22. At 28 is a switch normally closed but subject to being opened by an electro magnet 29 in a line 30. The closing of the first switch 22 acts through the line 27 to energize a magnet 31 to close a normally open switch 32 making the current pass through the line 33 to energize a magnet 34. These magnets 31 and 34 are severally grounded but the structure is so designed as to continue the current through the line 33 and magnet 34 to shift and hold an oscillatory switch blade 35 in the dotted line position. The normal set position is shown in full lines. The end of the switch remote from the magnet 34 is a bridge for connecting pairs of contacts in the various positions of the switch.

36 and 37 are main and auxiliary lines to the lamps 21 and indicator lamps 21' respectively. The lamps 21 are referred to above in connection with pin objectives. The lamps 21' are located in or on an indicator box adjacent to the players and score keeper. The action of both sets of lamps is the same, and a view of the indicator proves the condition of the pin objectives. These circuits are both normally closed, with the lamps all glowing, by reason of the contacts 38 bridged by the switch 35 in normal set position. The action of the magnet 34 throwing the switch to its opposite position breaks the light circuits at 38, but closes the circuits again through the contacts 39, the current from the contacts 39 passing through the line 40 to the second ball system. In the diagram we indicate at 21'' in dotted lines the location of the pin positions and especially the switches 23'' for the Nos. 7 and 10 pins, the lights 21 for which are caused to glow as a result of the bridging of the contacts 39, preparatory for the delivery of the second ball.

41 indicates another oscillatory switch held normally in mid position between two magnets 42 and 43 pertaining to the 7 and 10 pins respectively. The switch 41 normally bridges three contacts 44 through which the flow is from the line 40 through two independent lines 45 and 46 to Nos. 7 and 10 lamps respectively. If now the second ball closes a switch at 23'' for the No. 7 pin position, the circuit is closed through the line 47 and magnet 48, the action of which is to close the normally open switch 49 and send the current through the line 50 and the magnet 42 throwing the upper end of the switch to the right. At this time the contacts 52 are bridged lighting the lamp for pin No. 10. The movement of the switch from the contacts 44 opens the circuit to the lamp No. 7 extinguishing it. Exactly the same action in effect would take place if the No. 10 pin or switch were hit, the action being however through the magnet 43 and the shifting of the switch to the left bridging the contacts 53. Scientifically it is not expected that both pins 7 and 10 can be knocked down by the same second ball.

We make the long or wide switches, such for example as are indicated at 23'', in a number of sections all connected however in multiple so that any one of them will be sure to operate irrespective of the path of the ball with respect to the pin spot, it being remembered that the ball may knock any single pin from either side as well as along its center.

We wish it to be understood that any suitable switches or other electrical details may be employed in the practice of this invention so as to carry out the functions herein described more or less specifically and claimed broadly. In Figs. 5 and 6, however, we indicate a switch comprising a leaf 54 hinged at 55 flush with the surface of the alley 15, and so counter-weighted at 56 as to hold the contacts 57 normally spaced. The weight is suspended so nearly below the axis of the hinge as to offer a minimum resistance to the movement of the ball passing over the leaf 54. The regulation of the switch is through a set screw 58 with which the weight co-operates. Obviously any desired number of pairs of contacts may be closed by the movement of a single switch so as to produce the desired result. In Fig. 7 we show a leaf 54' acting upon a counter-weighted arm 56' through a plunger 59. In this form the idle movement of the counter-weight is limited by the upper end of the plunger striking against a stop 60.

To satisfy those patrons of the game who demand the sound of tumbling pins as a part of their reward we provide an automatic noise machine of suitable mechanical construction to produce a noise similar in kind and quantity to the number of pins supposed to be knocked down. The precise mechanical construction may be variously arrived at, but for the purpose of illustration we show a motor 61 to the shaft 62 of which are connected a spirally arranged series of arms or paddles 63 adapted to strike the correspondingly arranged series of bells 64 to be made of wood or any other suitable material and so tuned as to sound like the striking of a bowling alley pin when struck in the usual manner. These bells are suspended in the same plane and with the rotation of the shaft 62 they will all be struck in rapid succession. By causing the paddle shaft 62 to rotate through different extents according to the number of pins supposed to be struck, the amount and kind of noise produced will so nearly represent the noise to be expected, according to the score obtained, as to be practically indistinguishable from a regular bowling game.

As to the first ball operation there are two contacts 65 bridged momentarily by the switch 35 while moving from its idle to actuated position. This sends an impulse from the source of power through the line 66 to a condenser 67 and motor 61. The condenser 67 is designed to cause sufficient rotation of the paddle shaft 62 to produce a noise corresponding to the action of from seven to ten pins. Another condenser 67ª is provided to run the motor shaft to a less extent, or corresponding to the noise produced by from three to six pins, and at 67ᵇ is a condenser calculated to produce as much noise as would be created by the striking of from one to two pins. In the diagram of Fig. 10 wherein the first ball is presumed to knock all pins except Nos. 7 and 10, and the second ball will knock either 7 or 10, the condenser 67ª is not wired, but it will be understood that in the complete wiring of the apparatus for all possible strikes the several condensers will be wired to correspond to the quantitative results for all strikes.

In the second ball system of Fig. 10 the noise producing mechanism is caused to operate by the bridging of either of two pairs of contacts 65', momentarily, by the movement of the switch 41 in either direction, the action being through a line 66' to the same motor 61. In case the noise creating apparatus is not desired at any time the same may be cut out by opening a switch 68 in the motor circuit 66.

Ordinarily a ball when rolling from the rear end of the alley 15 can be received by a curved or spirally shaped surface 69, the momentum of the ball carrying it upward along said surface to a receiver 70 from which the ball will roll laterally into the receiving end 16' of the return gutter 16. Any suitable buffers 71 may be provided to deflect the ball into the receiver. Since there are no pins or other obstacles to retard the ball it will thus be returned immediately as a result of its own momentum, so that the player may deliver his "second ball" without delay even though he has only one ball in play. In event of a slip or other failure on the part of the player to make a proper delivery a dead ball or one lacking in momentum will gravitate to a pit gutter 72, inclined toward one end as will soon appear more fully.

The means preferred by us for returning a dead or slow moving ball to the player, or a ball which does not have sufficient momentum to initiate its own return, includes an automatic elevator suitably located adjacent to the gutter 72 into which any idle or slow ball will gravitate. This gutter is inclined to deliver the ball directly on to a platform 101 pivoted at 102 to tilt in normal idle position toward the gutter by virtue of a weight 103, but which under the weight of the ball passing the pivot point will tilt away from the gutter so as to retain the ball on the platform in carrying or lifting position. The platform may be attached to or constitute a part of any suitable design of cage 104 to hold the ball while being lifted. To the upper and lower portions of the cage are attached at 105 and 106 the ends of a flexible member 107 which operates over any suitably located direction pulleys 108 and to which traction is imparted by a wheel 109 operated by a reversible motor 110.

In the idle or receiving position the platform 101 is nearly level being held so by contact between the weight 103 and a fixed stop 111. At the opposite side of the platform from the weight is a contact 112 in line with the main circuit 113 from any suitable source of energy to and through the motor. When the ball rolls upon and tilts the platform downward the contact 112 is brought downward into engagement with a contact 115 from which a line 116 leads through a magnet 117 and also through contacts 118 to one side of the motor. The magnet 117 when energized swings a pendulum switch 119 into position to bridge the contacts 118. The magnet is kept energized through its shunt circuit to hold said switch in bridging position until the ball is elevated and the platform contact 112 comes into engagement with another contact 120 as a result of the front edge of the platform coming into engagement with a lug 121 fixed at the upper end of the guideway 122. The motor has momentum enough to continue the lifting of the platform and ball to effect the tilting of the platform so as to change the contact 112 from the contact 115 to the contact 120. As soon as the circuit is broken by the contact 115 the magnet 117 releases the switch 119 which by gravity swings to its normal upright position. As soon as the circuit is completed through the contacts 112 and 120 the reversing magnet 123 is energized through the line 124, causing the switch to bridge the contacts 125, reversing the motor. The platform is tilted sufficiently to deliver the ball therefrom into the return gutter 16', and the platform remains in its delivering position by virtue of the weight 103, maintaining the contacts 112 and 120 in engagement until the platform again reaches the bottom and the circuit is broken by reason of the stop member 111 and then the pendulum is restored to its normal vertical position.

127 indicates a vertically movable gate serving when the platform is lifting one ball, to close the exit from the gutter 72 to prevent a second ball to pass from the gutter into the elevator space. This gate is overweighted by a counterbalance 128 so as to insure the elevation of the gate with the elevation of the platform. When the platform returns to its normal position it will carry the gate with it below the gutter 72 allowing the succeeding ball to pass on to the platform. The elevator just described is entirely automatic and serves to lift the balls and deliver them into the elevated return gutter without delay even though the momentum of a ball may not be sufficient to return it more promptly by the momentum mechanism previously described.

We claim:

1. In bowling apparatus, the combination of an alley, a set of pin objectives located adjacent to the alley but out of the path of a ball rolling thereover, and means initiated by the rolling of the ball over the alley to cause such pin objectives to appear to be knocked down as correspond to the location on the alley of the same number and location of pins as would be knocked down by a ball rolling over the usual alley along the same path.

2. In bowling apparatus, the combination of an alley, a series of pin objectives located above the alley and path of a ball and having the same number and arrangement as the usual pins located upon the alley, and devices set into operation as a result of the rolling of the ball beneath the pin objectives serving to cause the pin objectives to disappear in accordance with the path of the ball.

3. In bowling apparatus, the combination with an alley and a ball adapted to roll thereover in the usual manner, of a series of pin objectives located above the path of the ball and having the appearance in number, size, and relative position of the usual pins, automatic means set into operation by the rolling of the ball in a predetermined path to cause a corresponding number and selection of the pin objectives to appear to be knocked down, said initiating means being rendered idle by the passage of a first ball, and other means to initiate the apparent knocking down of other pin objectives as a result of the passage of a second ball.

4. In bowling apparatus, the combination with a bowling alley and a ball adapted to roll thereover, of a set of pin objectives located adjacent to but out of the path of movement of the ball over the alley, and means whereby the rolling of a ball over the alley will cause certain of said objectives to appear to be knocked down according to the path of movement of the ball, said last mentioned means including two independent series of elements, the elements of each series being operative independently of each other.

5. A device as set forth in claim 4 in which one of said two series of elements is brought into action as a result of the previous action of the other series of elements.

6. A device as set forth in claim 4 in which the two series of elements are so constructed that one series is affected only by a "first ball" and the other is affected only by a "second ball" and as a result of the actuation of the first series by the first ball.

7. In bowling apparatus, the combination with an alley and a ball movable thereover, of a series of pin objectives located adjacent to but spaced from the alley, each pin objective including a lamp the light from which makes the objective visible, and means set into action by the movement of the ball over the alley along a certain path to cause the extinguishment of a light or lights and the corresponding disappearance of certain pin objectives according to the path of the ball.

8. A device as set forth in claim 7 in which the means for initiating the action of the lights includes two sets of elements to be actuated by a moving ball, one set of elements being operative from a first ball, and the other set of elements being operative only from a second ball.

9. In bowling apparatus, the combination with an alley and a ball movable thereover, of a series of pins located adjacent to the alley and spaced from the path of the ball, and electrical devices to cause the significance of the knocking down of certain pins as a result of the movement of the ball along a predetermined path between the pins and the alley.

10. In bowling apparatus, a series of immovable pins and electrical means to cause the disappearance of the pins in accordance with the movement of a ball, said electrical means including a series of switches any one of which is adapted to be closed by the movement of the ball thereover.

11. A device as set forth in claim 10 in which the switches are arranged in two independent series, the one becoming functional when and only when at least one of the other series has been made functional.

12. In bowling apparatus, the combination with an alley and a ball adapted to roll thereover, of a series of pins located adjacent to but out of the path of the ball, means actuated by the movement of the ball serving to cause certain pins to appear to be knocked down according to the path of the ball, and auxiliary means to cause noise similar in kind and quantity substantially to the knocking down of the number of pins that appear to be knocked down.

13. A device as set forth in claim 12 in which the means for causing the pins to appear to be knocked down and the creation of corresponding noise includes electrical devices set into action by the movement of the ball.

14. In an electrical bowling alley the combination of a series of pins spaced from the path of the ball, means to cause certain of the pins to appear to be knocked down as the result of the movement of the ball along a predetermined path, and means to cause the creation of noise corresponding in kind and quantity to the knocking down of such pins.

15. A device as set forth in claim 14 in which the sound producing means includes a motor, a series of bells, a series of paddles operated by the motor, and means to cause movement of the motor to variable extents according to the number of pins appearing to be knocked down.

16. A device as set forth in claim 14 in which the means for controlling the appearance of the pins and the generation of noise includes a normally open switch adapted to be closed by the movement of the ball thereover.

17. A device as set forth in claim 14 in which the means for controlling the appearance of the pins and the generation of the noise includes two series of normally open electric switches, the switches of one series being initially idle and brought into active condition as a result of the previous closing of a switch of the other series.

18. In bowling apparatus, the combination with an alley, a series of pins located thereover, and a ball adapted to roll along the alley beneath the pins to cause certain of said pins to appear to fall, of automatic indicator means and means set into action by the rolling of the ball along a certain path to make the result of the movement of the ball manifest on said indicator.

19. In bowling apparatus, the combination with an alley, a series of pins located thereover, and a ball movable along the alley to cause certain of said pins to appear to fall, of an indicator including a series of lamps corresponding in number and arrangement to the number and arrangement of the pins, and a series of lamps associated with said pins to control the appearance or disappearance thereof, and means actuated by the movement of a ball over the alley to cause an extinguishment of corresponding lights on both the indicator and the pins.

20. In bowling apparatus, the combination with an alley and a ball movable thereover, of a series of pins located above the alley and wholly out of the path of the ball, and automatic means to cause the return of the ball to the player, said ball returning means including a receiver located above the level of the pins and a curved surface acting through the momentum of the ball to lift the ball and deliver it into the receiver.

21. In bowling apparatus, the combination with an alley, a ball movable thereover, and a series of pins located above the alley, of automatic means to cause the return of the ball to the player, said automatic means including an elevator normally inactive but dependent automatically for its action upon the weight of the ball rolling thereupon.

22. In bowling apparatus the combination with an alley, a ball movable thereover, and a series of pins located above the alley, of means for returning the ball automatically including a device to lift the ball vertically from the level of the alley to a higher level irrespective of the momentum of the ball, whence it will return by gravity to the operator, said lifting means for the ball being set into action as a result of the ball rolling thereupon.

23. The combination with a bowling alley, of means to automatically return the ball to the player, said returning means for the ball including an automatic elevator set into action by the rolling thereupon of a ball.

24. A device as set forth in claim 23 in which the means for returning a ball automatically includes an electric elevator set into operation by the closing of a switch due to the rolling thereupon of a ball.

25. The herein described means for the automatic return of a bowling ball including an electric elevator, means to cause the elevator to be located in position to receive a ball by gravity, means to cause the weight of the ball to initiate the lifting action of the elevator, and means to automatically deliver the ball from the elevator after it is lifted.

In testimony whereof we affix our signatures.

FRANCIS J. SEVERENCE.
GEORGE W. TODD.
GEORGE DE LOREE.